Dec. 2, 1958     C. E. CADY     2,862,371
CONTROL SHAFT EXTENSION
Filed March 31, 1958
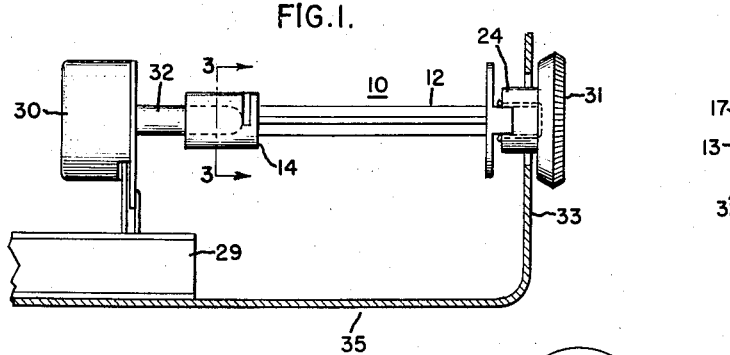
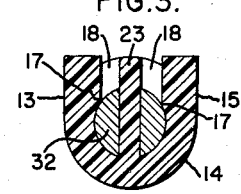
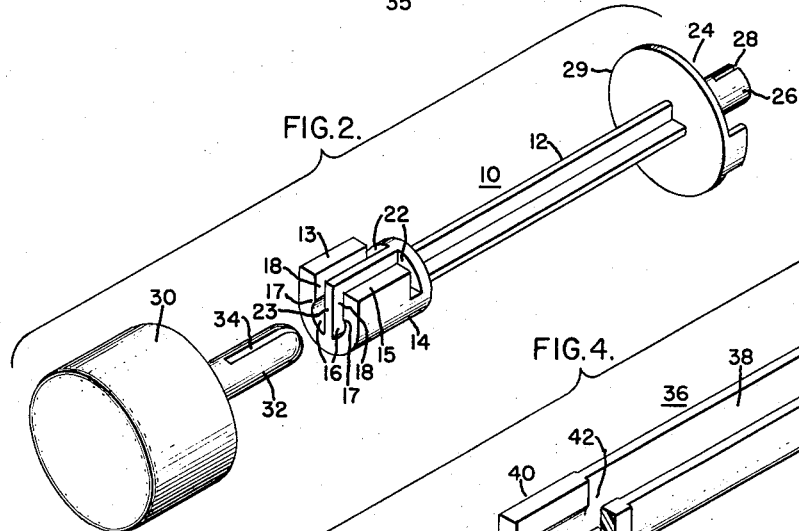
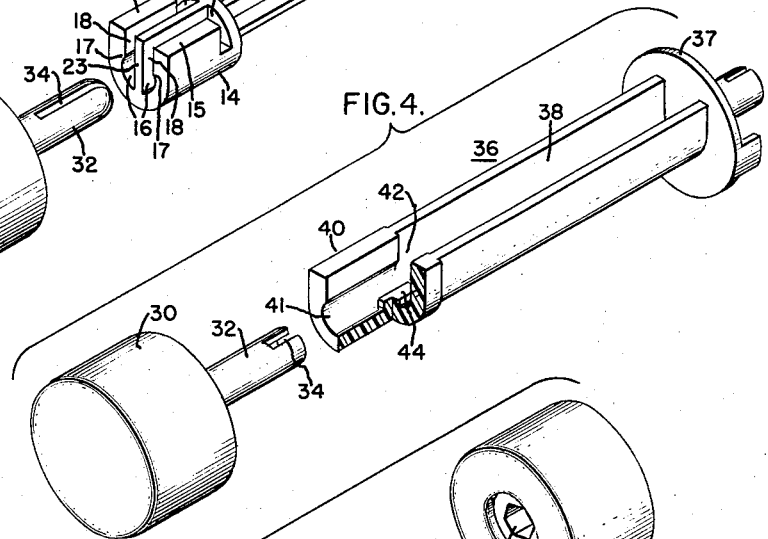
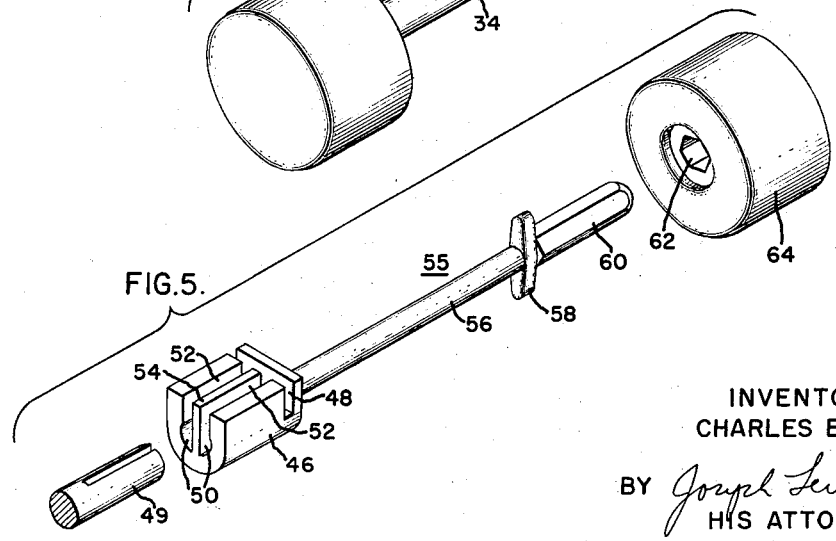
INVENTOR:
CHARLES E. CADY,
BY *Joseph Levinson*
HIS ATTORNEY.

United States Patent Office 2,862,371
Patented Dec. 2, 1958

2,862,371

CONTROL SHAFT EXTENSION

Charles E. Cady, North Syracuse, N. Y., assignor to General Electric Company, a corporation of New York Application March 31, 1958, Serial No. 725,314

5 Claims. (Cl. 64—4)

This invention relates to a shaft structure and more particularly to a readily removable control shaft extension which is used for coupling a control knob to an electrical component.

For many applications in electronic equipment, it would be desirable to provide a molded control shaft extension, which could be readily assembled and/or removed for interconnecting a control knob and an electrical component such as a potentiometer, a variable inductor or a variable capacitor, instead of using a conventional control shaft. One apparent advantage of such a device would reside in insulating the control knob from the control element. In equipment such as portable television receivers, the control shaft extension could be readily removed in order to gain access the the chassis for the replacement of such components as tubes. Also, the utilization of control shaft extensions would allow greater flexibility in electrical chassis design. Control shaft extensions are more readily adaptable to mass production techniques such as are used in the assembly of television receivers than are the conventional control shafts which are a unitary part of an electrical component.

Accordingly, it is an object of this invention to provide a novel control shaft extension structure which overcomes the difficulties encountered in using conventional control shafts and attains the aforesaid advantages.

A further object of this invention is to provide a control shaft extension in place of a conventional control shaft which is easy to assemble and less expensive than conventional control shafts.

A further object of this invention is to provide a control shaft extension configuration which is readily adaptable to molding.

In carrying out this invention in one illustrative embodiment thereof, a control shaft extension is provided having a receptacle on one end portion thereof. The receptacle is bounded by resilient sides which define a slot leading into an opening. The opening is provided with a tab. This receptacle is adapted to receive and engage a slotted shaft of one of the components which is to be mounted thereon. The slotted shaft of the electrical component is snapped into the opening of the receptacle through the slot, and the tab engages the slotted shaft to keep it from turning relative to the molded shaft extension when either is rotated. The other end of the shaft extension is provided with means for securing another component thereto.

These and other advantages of this invention will be more clearly understood from the following description taken in connection with the accompanying drawings, and its scope will be apparent from the appended claims.

In the drawings,

Fig. 1 is an elevation of one embodiment of the control shaft extension structure of this invention, Fig. 2 is an exploded view in perspective of the control shaft extension structure shown in Fig. 1, Fig. 3 is a cross-sectional view taken along lines 3—3 of Fig. 1, Fig. 4 is an exploded view in perspective of another embodiment of this invention, and Fig. 5 is an exploded view in perspective of still another embodiment of this invention.

Referring now to Fig. 1, the control shaft extension is referred to generally with the reference character 10. The control shaft extension 10 is made of any suitable insulating material which is capable of being molded such as nylon, polystyrene, etc. The control shaft extension 10 has an intermediate body or shaft portion 12 terminated on one end portion thereof by a receptacle 14 and on the other end portion thereof by a mounting means 26. A control knob 31 is attached to the mounting means 24 on one end of the control shaft extension 10. A potentiometer 30, which is mounted to chassis 29 by any suitable means, has a shaft 32 which is adapted to fit into the receptacle 14 of the control shaft extension 10. The potentiometer 30 can be adjusted by the control knob 31 which is insulated and spaced from the potentiometer 30 by the control shaft extension 10. Obviously, if the control shaft extension 10 was not provided, either the shaft 32 of the potentiometer 30 would have to be extended in length to meet the mounting requirements shown in Fig .1, or the potentiometer 30 would have to be positioned closer to a side 33 of the cabinet 35. In many applications, it may be preferable to space the potentiometer 30 from the control knob 31 in a manner similar to that shown in Fig. 1.

Fig. 2 shows more details of the control shaft extension 10. The receptacle 14 has a pair of resilient sides 13 and 15 bounding a slot 18 which extends into an opening 16. The recptacle 14 is slotted at 22 in order to make sides 13 and 15 more resilient. A tab 23 is provided which extends through the slot 18 and the opening 16 to bisect the slot 18 and the opening 16. The receptacle 14 is adapted to receive the potentiometer shaft 32 having a slot 34 therein. The shaft 32 of potentiometer 30 is adapted to snap into the opening 16 through the slot 18 and is held in place by a pair of curved cone portions 17 in the resilient sides 13 and 15 and by the tab 23 which registers with the slot 34 in shaft 32. Fig. 3 shows the shaft 32 positioned in the receptacle 14. The receptacle 14 thus provides a means for readily attaching the shaft extension 10 to the potentiometer 30 or for rapidly removing it therefrom. The other end of the control shaft extension 10 is provided with a mounting stud 26 having a slot 28 therein which is adapted to accommodate the control knob 31 as shown in Fig. 1. A stop means or ring 29 is also provided in order to keep or retain the shaft in the cabinet 31.

Fig. 4 shows an alternative embodiment of this invention in which a control shaft extension 36 is provided with a hollow intermediate body portion 38. A receptacle 40 which is located at one end of the intermediate body portion 38 is provided with a slot 42 which leads into an opening 41. A tab 44 is provided in the opening 41 and corresponds to the tab 23 shown in Fig. 2, but in this embodiment the tab does not extend entirely through the slot and the opening as shown in Fig. 2. The slotted shaft 32 of the potentiometer 30 is snapped into the opening 41 through the slot 42, and the slot 34 of the shaft 32 registers with the tab 44 to hold it in place in a manner similar to that shown in Fig. 2. A stop means or ring 37 is utilized on the other end portion of the control shaft extension 36 to prevent the shaft from being able to pass through the cabinet. The provision of a hollow shaft extenson 36 with a proper hole being provided in the ring 37 (not shown) would allow the insertion of an alignment screwdriver therein which could be utilized to adjust a component such as a variable capacitance or inductance.

In Fig. 5, the control shaft extension 55 of this embodiment has an intermediate body portion 56, terminated on one end portion thereof in a hexagonal stud 60. The hexagonal stud 60 is adapted to fit into a hexagonal opening 62 of a potentiometer 64. A stop means 58 is provided to position the hexagonal stud 60 in the potentiometer 64. The other end portion of control shaft extension 55 has a receptacle 46 similar to receptacle 14 of Fig. 2. The receptacle 46 is provided with a slot 52 leading into an opening 50 and has a tab 54 running through the slot 52 and the opening 50. The receptacle 46 is also slotted at 48 to provide greater resiliency in the sides of the receptacle 46. The slotted shaft 49 is adapted to fit into the receptacle 46 in a maner described in connection with Fig. 2.

Since the control shaft extension embodied in this invention are of a molded insulating material, they effectively insulate the control knob from the component being controlled. Consequently, even though the knob be removed, the chance of receiving an electrical shock from a charge on the control shaft is thereby eliminated.

As will be obvious from the aforesaid disclosure, the control shaft extensions embodied in this invention are easy to assemble and can be readily removed. The shaft extensions may be made in different lengths, thereby allowing the same chassis to be used with different types and sizes of cabinets. Furthermore, the molded shaft extensions are easy to manufacture and are less costly than conventional control shafts which generally extend from and are a unitary part of an electrical component, such as a variable capacitor or potentiometer.

The material used in molding the control shaft extensions provide the resiliency required for the captive holding utilized in this invention. The control shaft extensions provide for a positive connection between the components which they are designed to intercouple. In many applications involving compact electronic equipment, such as a portable television receiver, the control shaft extensions may be readily removed in order to gain access to portions of the chassis which might otherwise be inaccessible if conventional control shafts were used.

Since other modifications varied to fit particular operating requirements and environments will be apparent to those skilled in the art, this invention is not considered limited to the examples chosen for purposes of illustration and covers all changes and modifications which do not constitute departures from the true spirit and scope of this invention.

What I claim as new and desire to secure by Letters Patent of the United States is:

1. A control shaft extension for coupling two components together one of which has a slotted shaft comprising, a molded shaft extension having a receptacle on one end portion thereof, said receptacle having resilient sides defining an opening therein and a slot extending into said opening and a tab positioned centrically in said opening, said receptacle adapted to receive a slotted shaft, the slotted shaft being snapped into said opening through said slot with said tab registering with the slotted portion of the shaft, and means on the other end portion of said molded shaft extension for securing another component thereto.

2. The structure defined in claim 1 in which said receptacle is generally U-shaped.

3. The structure defined in claim 1 in which said tab extends from the top of said slot to the bottom of said opening.

4. The structure defined in claim 1 in which said means comprises a slotted stud.

5. The structure defined in claim 1 in which said means comprises a hexagonal stud.

References Cited in the file of this patent

UNITED STATES PATENTS

| | | |
|---|---|---|
| 1,104,838 | Sebastian | July 28, 1914 |
| 2,580,000 | Batcher | Dec. 25, 1951 |
| 2,699,925 | Madl | Jan. 18, 1955 |
| 2,799,170 | Davis | July 16, 1957 |